United States Patent [19]
Woerner

[11] 3,728,413
[45] Apr. 17, 1973

[54] REDUCED FOULING IN OXIDATIVE DEHYDROGENATION PROCESS

[75] Inventor: Rudolph C. Woerner, Houston, Tex.

[73] Assignee: Petro-Tex Chemical Corporation, Houston, Tex.

[22] Filed: Aug. 4, 1970

[21] Appl. No.: 60,899

Related U.S. Application Data

[63] Continuation-in-part of Ser. No. 775,862, Nov. 14, 1968, Pat. No. 3,683,042.

[52] U.S. Cl.......260/680 D, 260/680 E, 260/681.5 R
[51] Int. Cl................................................C07c 5/18
[58] Field of Search .....................260/680 E, 680 D, 260/681.5

[56] References Cited

UNITED STATES PATENTS

| 3,327,001 | 6/1967 | Tschopp | 260/680 |
| 3,536,775 | 10/1970 | Hutson et al. | 260/681.5 |
| 3,336,414 | 8/1967 | Woerner | 260/681.5 |

FOREIGN PATENTS OR APPLICATIONS

| 946,968 | 1/1964 | Great Britain | 260/680 |

Primary Examiner—Paul M. Coughlan, Jr.
Attorney—G. Baxter Dunaway

[57] ABSTRACT

Oxygenated impurities are separated from oxidative dehydrogenation effluents by treating the effulent by cooling, compressing, cooling by direct contact with water and scrubbing. Reduced fouling of equipment is achieved.

12 Claims, 1 Drawing Figure

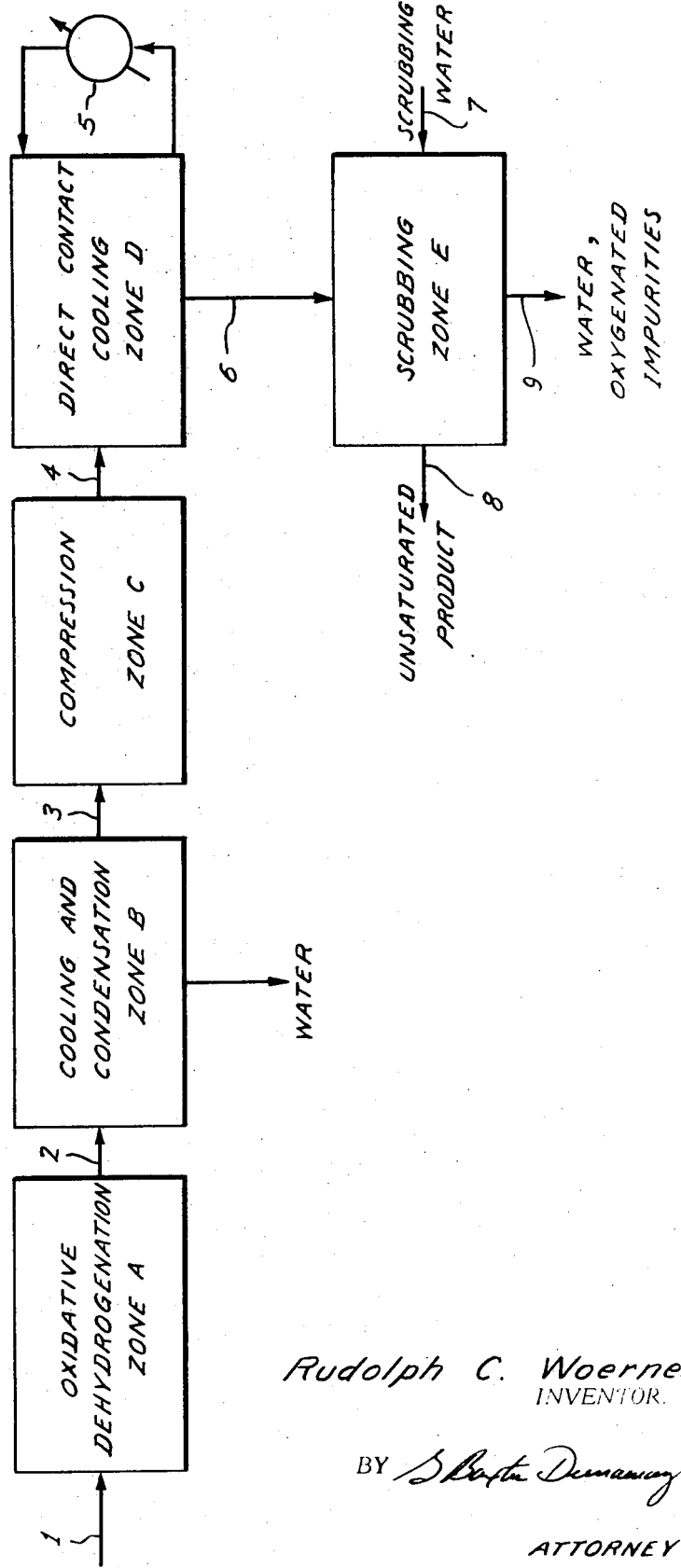

REDUCED FOULING IN OXIDATIVE DEHYDROGENATION PROCESS

1. CROSS REFERENCE TO OTHER APPLICATIONS

This application is a continuation-in-part of Ser. No. 775,862, filed Nov. 14, 1968 and entitled Reducing Fouling in Oxidative Dehydrogenation Processes, now U.S. Pat. No. 3,683,042.

BACKGROUND OF THE INVENTION

2. Field of the Invention

This application relates to the oxidative dehydrogenation of organic compounds in vapor phase by a process wherein dehydrogenation is accomplished by reacting oxygen or a source of oxygen with hydrogen from an organic compound in order to dehydrogenate the compound. The reactor effluent gases are purified by a process including compression.

3. Description of the Prior Art

It is known to dehydrogenate organic compounds by contacting the organic compound at an elevated temperature with oxygen, such as disclosed in U.S. Pat. Nos. 3,270,080; 3,303,234; 3,303,235; 3,303,236; 3,303,238; 3,308,182 through 3,308,201; 3,324,195; 3,334,152 and 3,342,890.

4. Background of Invention

The recovery of the products from the dehydrogenation zone effluent from oxidative dehydrogenation processes has presented a number of problems unique to these processes. One of the principal difficulties in these processes is that the equipment downstream from the reactor becomes fouled with polymeric-like substances. It is believed that these polymers are polymers of oxygenated compounds but Applicant does not wish to be limited to any theory for the formation of these polymers. Because oxygen is employed in the dehydrogenation almost invariably there is present a certain amount of these undesired oxygenated compounds which are precursors of polymers. For example, in the dehydrogenation of hydrocarbons the impurities may be in the form of oxygenated compounds such as acids, aldehydes, ketones and the like. These oxygen compounds may be either saturated or unsaturated but it is believed that the most troublesome compounds are the unsaturated compounds such as acrolein, methacrolein and the like. The effluent gases leaving the dehydrogenation zone are at a high temperature and it is necessary to cool these gases, to separate the non-condensable gases and separate the desired unsaturated product. In addition to equipment fouling another difficulty in the separation of the oxygenated impurities is that the impurities are present in relatively small quantities based on the total gaseous stream and it is necessary that these impurities be essentially completely removed in an economical and efficient manner. Difficulties are encountered in these separations particularly when the gases must be compressed as the fouling of equipment is particularly critical at various points in and around the compressor and downstream from the compressor.

5. Description of Preferred Embodiments

According to this invention an efficient method for the separation with reduced fouling of oxygenated impurities from an oxidative dehydrogenation process has been discovered which comprises (1) cooling the effluent gases (2) compressing the cooled gases in a compression zone (3) cooling the resulting compressed gases by direct liquid contact with water in a direct contact cooler and thereafter (4) scrubbing the compressed and cooled gases with water in a scrubbing zone to remove the said oxygenated impurities. By such a process the fouling of the recovery equipment has been significantly reduced and the amount of down time has been cut. Furthermore, when the equipment does need cleaning it has been discovered that a different type of polymer is produced and that this polymer is more easily removed. The overall result is that the process may be operated for longer periods of time prior to the shutdown of key equipment.

One preferred embodiment of the invention is illustrated in the drawing. A gaseous mixture of the compound to be dehydrogenated, oxygen, noncondensable gases and perhaps steam are fed by line 1 to the dehydrogenation zone A. Preferably, the oxygen is supplied as air. The dehydrogenation reaction may be conducted in the absence of contact catalysts, but better results are obtained if the reaction is conducted in the presence of metal or metal compound catalysts, such as disclosed in the patents cited herein. The dehydrogenation reactor may be a fixed or fluid bed reactor. The conditions of reaction may be as disclosed in any of the cited Patents such as U.S. No. 3,334,152. For convenience, the invention will be illustrated for the dehydrogenation of hydrocarbons and with a process where oxygen is fed to the reactor but it is understood that other dehydrogenatable organic compounds may be substituted in the example and that the oxygen may be supplied by a solid oxidant. It is also understood that it is not essential to have present noncondensable gases.

The effluent 2 from the dehydrogenation zone will contain the impure unsaturated hydrocarbon products, various impurities including oxygenated hydrocarbons, noncondensable gases and perhaps unconverted hydrocarbon, oxygen and steam. When air is used as the source of oxygen, nitrogen will be present in relatively large quantities as a noncondensable gas. Steam may be present in an amount up to 96 mol percent of the total effluent, such as from about 5 to 96 mol percent. The organic phase including dehydrogenated product, any unreacted feed, oxygenated hydrocarbons, polymer and tar and precursors thereof and any organic decomposition products usually range from about 1 to 50 mol percent of the effluent and generally will be within the range of or about 3 to 30 or 35 mol percent of the effluent. The noncondensable gases (The term "noncondensable" or "inert noncondensable" gases refers to those gases, other than hydrocarbons, such as nitrogen, $CO_2$ and CO, which do not condense under the conditions encountered.), such as nitrogen or $CO_2$, will usually be present in an amount of from or about 20 to 93 mol percent of the total effluent, but more often will be within the range of about 40 to 80 mol percent.

The effluent gases 2 leaving the dehydrogenation zone will generally be at a temperature of about or greater than 600°F. or 700°F. to 1,600°F. depending upon the particular dehydrogenation process. The reactor effluent may be cooled by any means or combination of means in cooling and condensataion zone B as by quenching, waste heat boilers, condensers, vapor separators, and the like in any sequence. Preferably the major portion of any water present in the effluent will be removed as condensed steam from the gaseous effluent during this cooling and condensation operation. The cooled gaseous stream 3 may preferably then be compressed in compression zone C. The invention is not restricted to the particular processes prior to compression zone C. For example, an oil quench or other step may be included.

The gaseous composition 3 to be fed to the compression zone C will usually comprise, exclusive of any water present, about or from 3.5 to 80 mol percent of unsaturated organic compound such as hydrocarbon, about or from 0.0005 to 2.5 mol percent of carbonyl compounds (Except where expressed otherwise, all references in this application are to overall quantities of carbonyl compounds as determined by ASTM Method D-1089 and reported as acetaldehyde. Generally, the carbonyl compounds will have from two to eight carbon atoms, e.g., from two to six carbon atoms when a $C_4$ to $C_6$ compound is being dehydrogenated, and will have from one to two carbonyl groups.), and optionally about or from 20 to 93 mol percent of noncondensable gases (i.e., noncondensable under the conditions at point 3), all based on the total mols of gaseous composition 3 being fed to compression zone C, exclusive of any water. Included in the noncondensable gases will be any nitrogen, oxygen, CO or $CO_2$, and the like. The oxygen content may vary, but suitably will be less than 10 mol percent of 3. Steam may also be present in 3 in an amount from 0 to 20 or up to such as 50 mol percent or more of the gaseous composition 3. Also present in the gaseous mixture 3 may be hydrocarbon by-products and unconverted hydrocarbons such as olefins or saturated hydrocarbons.

A preferred composition 3 to be fed to compression zone C will comprise, exclusive of any water present, about or from 5 to 65 mol percent of unsaturated hydrocarbons, about or from 0.005 to 1.2 mol percent of carbonyl compounds and about or from 45 to 89 mol percent of the non-condensable gases. A particularly preferred composition 3 contains about or from 8 to 65 mol percent butadiene-1,3, about or from 0.1 to 40 mol percent butene, and about or from 40 to 75 mol percent nitrogen. The composition of the compressed gases at 4 may be within the same ranges as given for point 3.

Compression in compression zone C may be by any suitable mechanical compressors such as reciprocating or centrifugal compressors. Compressors conventionally employed in the recovery of butadiene-1,3 are suitable such as Clark reciprocating compressors. The pressure and temperature of the gases discharging from the compressors will depend upon the particular compressor employed, the pressure and the type of equipment downstream from the compressor, the temperature of cooling water available and the like but typically will be at a temperature of at least 125°F and a pressure of at least 75 p.s.i.g. but generally the temperature will be at least 175°F and the pressure at least 100 p.s.i.g.

To reduce fouling in the compressor discharge line preferably the gaseous flow rate in the discharge line is maintained at a flow rate of at least 20 feet per second and preferably at least about 25 or 30 feet per second. This flow rate may be provided by suitably sizing the discharge line. The flow rate referred to is the maximum rate in the line from the compressor to the point at which the gases are cooled in the direct contact cooler zone D. Of course, the stated flow rate may not be achieved immediately at the point of discharge from the compressor because of the necessity to reduce line sizes and perhaps to provide for means to reduce compressor vibration. At any rate, the referred to flow rate will generally be maintained in the major portion of the distance the gases travel from the compressor discharge to the zone D.

The gases from the compressor discharge are then cooled by direct contact cooling in zone D. The means used for direct contact cooling may be any type of equipment or apparatus for intimately contacting gases and liquids such as tray columns including cross-flow plate and counterflow plate types, bubble cap columns, packed columns and spray systems including spray towers (open or packed), cyclonic spray towers, venturi scrubbers, and so forth. The size, flow rates of gases and cooling water, pressure, temperatures and other conditions in the direct contact zone may be varied to achieve the desired cooling. The zone may include more than one type of apparatus or the apparatus may be a combination of types. It is essential that the gases be directly contacted with the cooling water. The major amount of heat removed from the gases in the area between the compressor and the scrubber to remove the oxygenated compounds is by direct contact with water. This heat removal in the direct contact zone may be by a combination of means such as by the spraying of water into the discharge line from the compressor as disclosed in parent application Ser. No. 775,862 filed Nov. 14, 1968 together with direct contact in a cooler wherein water is recirculated such as in a separate piece of equipment. Preferably the oxygenated impurities are predominately or essentially in the gaseous phase in the stream 6 leaving the direct contact cooling zone D.

If water sprays are employed in the compressor discharge line the sprays may be installed at any point in the compressor discharge line. One or more sprays may be employed and any suitable type of spray nozzles may be employed. Preferably the water spray is concurrent with the flow of gases and the water pressure is high enough that some of the spray reaches the pipe walls. The conditions of temperature and flow rate of the water spray are preferably controlled such that the water spray will at least partially, and preferably predominately, remain in the liquid phase until the gases contact the next piece of cooling equipment. Preferably the flow pattern is such that a major portion of the inside circumference of the line is contacted.

In the direct contact zone D the gases must be cooled from the temperature encountered at the point of discharge from the compressor. The amount of cooling required will depend on the temperature of the compressor discharge gases and on the temperature at which the scrubber E is operated but normally the compressor discharge gases will be cooled at least 50°F. and preferably at least 100°F. in zone D. In the direct contact zone D preferably at least 50 weight percent and more preferably at least 75 weight percent of the water used for cooling by direct contact is recirculated to the zone for further cooling.

The cooling water used in the direct contact zone D may be cooled and recirculated through cooling means 5. This cooling means may be any type of heat exchanger to cool the water. If desired a portion of the cooling water may be bled off to remove any dissolved or contained materials but as pointed out above most of the water is recirculated.

The cooled gases 6 preferably will be at a temperature of no greater than 150°F. or 180°F. and more preferably no greater than 125°F. Higher temperatures can be tolerated but this results in less efficient operation of scrubbing zone E.

The scrubbing zone E is the zone in which the oxygenated impurities are scrubbed out and separated. This zone may comprise conventional scrubbing equipment such as open, packed or tray type scrubbers. The temperature in the tower will suitably be within the range of 60° to 150°F. but can be outside this range depending on flow rates, efficiency, etc. A preferred range is from 80°F. to 110° or 125°F. e.g. for $C_4$ hydrocarbons and between 120°F. and 160°F. for $C_5$ hydrocarbons. The pressure range e.g. for $C_4$ to $C_5$ hydrocarbon scrubbing will preferably between 110 p.s.i.a and 170 p.s.i.a. The composition fed to the scrubbing zone will be the same preferred composition as described for the composition fed to the compression zone C. The scrubbing water 7 may be introduced at a flow rate and temperature selected to effectively scrub out the oxygenated impurities. The oxygenated impurities are removed as stream 7 in the scrubbing water. The scrubbed gases 8 comprise the unsaturated product and may be treated to further separate and purify the gases such as by extractive distillation, C A A extraction, fractional distillation and the like.

In the claims and specification references to water as a contact liquid are understood to encompass aqueous compositions which comprise water as the major ingredient but which may contain dissolved or contained solids or liquids other than water.

The process of this invention may be applied to the recovery of products produced by the dehydrogenation of a wide variety of organic compounds. Such compounds normally will contain from two to 20 carbon atoms, at least one

grouping, a boiling point below about 350°C., and such compounds may contain other elements, in addition to carbon and hydrogen such as halogens, nitrogen and sulphur. Preferred are compounds having from two to 12 carbon atoms, and especially preferred are compounds of three to six or eight carbon atoms.

Among the types of organic compounds which may be dehydrogenated by means of the process of this invention are nitriles, amines, alkyl halides, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2-chlorobutene-1 or 2, 3 dichlorobutane to chloroprene, ethyl pyridine to vinyl pyridine, ethylbenzene to styrene, isopropylbenzene to α-methyl styrene, ethylcyclohexane to styrene, cyclohexane to benzene, methane to ethylene and acetylene, ethane to ethylene to acetylene, propane to propylene or methyl acetylene, allene, or benzene, isobutane to isobutylene, n-butane to butene and butadiene-1,3,butene to butadiene-1,3 and vinyl acetylene, methyl butene to isoprene, cyclopentane to cyclopentene and cyclopentadiene-1,3,n-octane to ethyl benzene and ortho-xylene, monomethylheptanes to xylenes, propane to propylene to benzene, 2,4,4-trimethylpentane to xylenes, the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3 dichlorobutane, 1,4 dichlorobutane, the chlorofluoroethanes, methyl pentane, and the like.

Suitable dehydrogenation reactions are the following: acyclic compounds having four to five non-quarternary contiguous carbon atoms to the corresponding olefins, diolefins or acetylenes having the same number of carbon atoms; aliphatic hydrocarbons having six to 16 carbon atoms and at least one quarternary carbon atom to aromatic compounds, such as 2,4,4-trimethylpentene-1 to a mixture of xylenes; acyclic compounds having six to 16 carbon atoms and no quarternary carbon atoms to aromatic compounds such as n-hexane or the n-hexenes to benzene; cycloparaffins and cycloolefins having five to eight carbon atoms to the corresponding olefin, diolefin or aromatic compound, e.g., cyclohexane to cyclohexene or cyclohexadiene or benzene; aromatic compounds having eight to 12 carbon atoms including one or two alkyl side chains of two to three carbon atoms to the corresponding aromatic with unsaturated side chain such as ethyl benzene to styrene.

The preferred compounds to be dehydrogenated are hydrocarbons with a particularly preferred class being acyclic non-quarternary hydrocarbons having three or four to five contiguous carbon atoms or ethyl benzene and the preferred products are n-butene-1 or 2, butadiene-1,3,vinyl acetylene, 2-methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent.

The organic compound to be dehydrogenated is contacted with oxygen in order for the oxygen to oxidatively dehydrogenate the compound. The oxygen may be supplied to the organic compound from any suitable source as by feeding oxygen to a dehydrogenation zone for example as disclosed in U.S. Pat. No. 3,207,810 issued Sept. 21, 1965. Oxygen may be fed to the reactor as pure oxygen, as air, as oxygen-enriched air, oxygen mixed with diluents, and so forth. Oxygen may also be supplied by means of a transport or moving oxidant type of process such as disclosed in U.S. Pat. No. 3,050,572 issued Aug. 21, 1962 or U.S. Pat. No. 3,118,007 issued Jan. 14, 1964. The term oxidative dehydrogenation process when used herein means a process wherein the predominant mechanism of dehydrogenation is by the reaction of oxygen with hydrogen.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor or solid oxidant to the reactor) in the dehydrogenation zone in an amount from about 0.2 to 1.5, preferably 0.3 to 1.2, mols per mol of $H_2$ being liberated from the organic compound. Ordinarily the mols of oxygen supplied will be in the range of from 0.2 to 2.0 mols per mol of organic compound to be dehydrogenated and for most dehydrogenations this will be within the range of 0.25 to 1.5 mols of oxygen per mol of organic compound.

Halogen or other additives may be present in the dehydrogenation step such as disclosed in the above cited patents, e.g., U.S. Pat. No. 3,334,152 issued Aug. 1, 1967. Means for separating halogen may also be incorporated in the dehydrogenation reactor or downstream.

Preferably, the reaction mixture contains a quantity of steam or diluent such as nitrogen with the range generally being between about 1 or 2 and 40 mols per mol of organic compound to be dehydrogenated.

The temperature for the dehydrogenation reaction generally will be at least about 250°C., such as greater than about 300°C. or 375°C., and the maximum temperature in the reactor may be about 700°C. or 800°C. or perhaps higher such as 900°C. under certain circumstances. However, excellent results are obtained within the range of or about 350°C. to 700°C., such as from or about 400°C. to or about 675°C. These temperatures are measured at the maximum temperature in the dehydrogenation zone.

The remaining conditions, catalysts, flow rates and the like for oxidative dehydrogenation are known to those skilled in the art and may be e.g., as disclosed in U.S. Pat. No. 3,334,152 issued Aug. 1, 1967, or any of the remaining patents cited herein.

Example 1

The invention can best be illustrated by a specific example. Reference is made to the drawing for the various pieces of equipment and streams. A hydrocarbon stream comprising butene-2 as the major component is oxidatively dehydrogenated to butadiene-1,3 in reactor A. The feed 1 to the reactor includes air and steam. The effluent 2 from the reactor comprises butadiene-1,3 unreacted butene, carbonyl compounds, steam, noncondensable gaseous components such as nitrogen and various dehydrogenation by-products such as $CO_2$. The effluent is cooled and most of the water is removed in the steam condensation zone B. The gaseous stream is then compressed in the compression zone C. The compressed gases at point 4 comprise by mol percent approximately a total of 64.8 percent noncondensable gases (mostly nitrogen, but also includes the other residual gases of air, as well as CO and $CO_2$) and 32.3 percent hydrocarbons. The hydrocarbon portion is primarily $C_4$'s with butadiene-1,3 being the major component. The composition also contains 2.6 percent water and by chromatographic analysis 0.15 percent acetaldehyde, 0.01 percent crotonaldehyde, 0.05 percent acrolein and 0.01 percent methacrolein. The gases are at a temperature of 280°F. and 141 p.s.i.g.

The compressed gases are then cooled and scrubbed to remove the oxygenated compounds. In this Example 1 the gases are cooled by indirect cooling and thereafter scrubbed. This represents a comparative run which is to be compared with the example below utilizing direct cooling according to this invention. The indirect coolers are heat exchangers which are parallel banks of two pass exchangers with three exchangers in series in each bank with the tube size being three-fourths inch in a one inch square pitch design. The coolers are followed by a knockout drum containing no internals. The purpose of the knockout drum is to remove excess water, polymer, etc. prior to sending the overhead gases from the knockout drum to the scrubber.

The gases entering the scrubber E are at a temperature of approximately 114°F. The scrubber is a tray type tower having 40 trays with scrubbing water entering the top of the tower at a temperature of 100°F. The feed rates of the gaseous composition 6 to be scrubbed to the aqueous composition 7 used as scrubbing water is about 18 mols of gas per gallon of scrubbing water. The pressure in the top of the scrubber is 131 p.s.i.g. The scrubbed gases 8 are at a temperature of 105°F. and are further treated to separate the hydrocarbons. The scrubber discharge water 9 contains the oxygenated impurities.

Example 2.

Example 1 is repeated with the exception that the compressor discharge gases are not routed to the indirect heat exchanger and knockout drum per Example 1 but rather are cooled in a direct contact cooler. The direct contact cooler is a tower consisting of 8 sieve trays at the top of the tower and the bottom of the tower contains 10 spray nozzles in an open spray section which is located directly below the bottom sieve tray. The incoming gases enter near the bottom of the tower and are first contacted with the sprays from the nozzles and the gas then passes through the sieve trays and is removed overhead. The knockout drum has been eliminated as not being necessary with this scheme. In this example the discharge line from the compressor is reduced and water is sprayed in the line to reduce fouling in the discharge line as disclosed in parent application Ser. No. 775,862 filed Nov. 14, 1968. The spray water to the direct contact cooler spray nozzles is at a temperature of 100°F. The gases fed to the tower are at a temperature of 280°F. and at a pressure of 141 p.s.i.g. The pressure at the top of the tower is 139 p.s.i.g. The water from the bottom of the tower is recirculated through indirect contact coolers (item 5 on drawing) with the temperature of the water leaving the tower being 132°F. The cooled water which has been cooled in the cooler 5 is at a temperature of 110°F. and is recirculated to the top of the tower. The cooled gaseous stream 6 which is the overhead from the towers is at a temperature of 114°F. (varies upward e.g. 120° F. or 130° F. if the water rate to tower is varied). The composition of stream 6 is essentially the same as that of the incoming gases 4 with the exception that a minor amount of water (about 7 percent) may be bled off from the recirculating water to remove any minor amount of dissolved or contained materials. The overhead gas stream 6 from the tower is fed to the scrubber E as in Example 1. The scrubbed gases 8 contain the unsaturated product containing by mol percent 7 ppm acetaldehyde and 23 ppm methacrolein.

The advantages of operation according to this invention can be illustrated in the following table with Example 2 representing this invention.

TABLE

| | Example 1 | Example 2 |
|---|---|---|
| Average Days Between Cleaning of Cooler | 85 | 275 |
| Compressor Amps | 415 | 390 |
| Compressor Discharge PSIG | 160 | 139 |
| Type of Fouling of Cooler | Hard Polymer, Normal cleaning by burning in oven. | Soft Polymer Removed with High pressure water |

It is noted that the frequency of cleaning of the cooler is markedly reduced and the ease of cleaning is also much easier due to the changed nature of the polymer. It is also noted that the compressor can operate at a much lower discharge pressure and the compressor pulls less amperage. The compressor discharge pressure and amperage is influenced by all of the equipment downstream but the lack of fouling of the direct contact cooler undoubtedly contributes significantly to this reduction.

I claim:

1. A process for the reduction of fouling in the separation of oxygenated impurities from oxidative dehydrogenation reactor effluent gases from an oxidative dehydrogenation of hydrocarbons utilizing oxygen as an oxidative dehydrogenation reactant which comprises
   1. cooling the said effluent gases to remove a major portion of water present in said effluent gases,
   2. compressing the cooled gases in a compression zone to a pressure of at least 75 p.s.i.g. and a temperature of at least 175°F.,
   3. cooling the resulting compressed gases at least 50°F. by direct liquid contact with water in a direct contact cooling zone with at least 50 weight percent of the water used for said cooling being recirculated to said direct contact cooling zone and, thereafter,
   4. in a separate step scrubbing the resulting compressed and cooled gases at a temperature of between 60° and 150°F. with water in a scrubbing zone to remove the said oxygenated impurities.

2. The process of claim 1 wherein the said cooling of the compressed gases by direct liquid contact is to a temperature such that the said oxygenated impurities are essentially in the gaseous phase on discharge from said direct contact cooler.

3. The process of claim 1 wherein the temperature of the compressed and cooled gases just prior to said scrubbing zone is no greater than 125°F.

4. The process of claim 1 wherein the velocity of the gases in the discharge line from said compressor is at least 20 feet per second.

5. The process of claim 1 wherein water is sprayed into the discharge line from said compression zone.

6. The process of claim 1 wherein the compressed gases in the discharge line from said compression zone comprise from 3.5 to 80 mol percent of unsaturated hydrocarbon and from about 20 to 93 mol percent non-condensable gases.

7. The process of claim 1 wherein the compressed gases in the discharge line from said compression zone comprise about 0.0005 to 2.5 mol percent carbonyl compounds.

8. The process of claim 1 wherein the said reactor effluent gases comprise a hydrocarbon of four to five carbon atoms having a straight chain of at least four carbon atoms.

9. The process of claim 1 wherein the said reactor effluent gases comprise butadiene-1,3.

10. The process of claim 1 wherein halogen is employed in the oxidative dehydrogenation reaction.

11. In a process for the oxidative dehydrogenation of acyclic hydrocarbon compounds having from four to five carbon atoms utilizing oxygen as an oxidative dehydrogenation reactant to produce an oxidative dehydrogenation reactor effluent gas comprising from about 5 to 96 mol percent steam and from 1 to 50 mol percent of an organic phase comprising dehydrogenated hydrocarbon product water as steam and oxygenated hydrocarbons as an impurity, the improvement comprising
   1. cooling the said effluent gases to remove a major portion of water from said effluent gases,
   2. compressing the cooled and condensed gases in a compression zone to a pressure of at least 75 p.s.i.a. and a temperature of at least 175°F. to form a compressed gas stream containing oxygenated hydrocarbons,
   3. cooling the resulting compressed gases by direct liquid contact with water in a direct contact cooling zone to cool the gases by at least 50°F., at least 50 weight percent of the water used for said cooling is cooled and recirculated to the direct contact cooling zone for further cooling, the said cooling being to a temperature such that the oxygenated hydrocarbons are essentially in the gaseous phase on discharge from the direct contact zone, and
   4. in a separate step scrubbing the resulting compressed and cooled gases with water at a temperature of between 60° and 150°F. in a scrubbing zone to remove said oxygenated hydrocarbon impurities.

12. The process of claim 11 wherein the said oxidative dehydrogenation is the dehydrogenation of butene to butadiene-1,3.

* * * * *